Jan. 14, 1958 K. M. HENRY ET AL 2,819,561
APPLICATION OF VITREOUS SEALANT TO GLASS SEALING EDGES
Filed Sept. 25, 1956
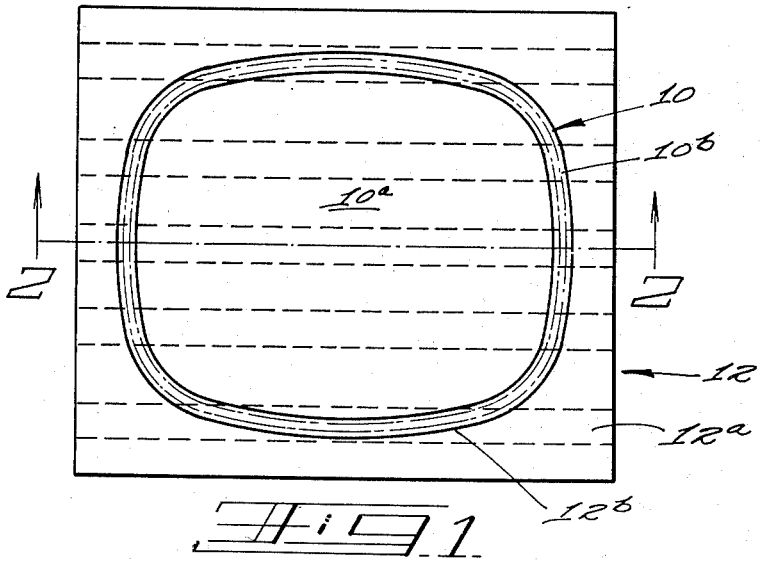
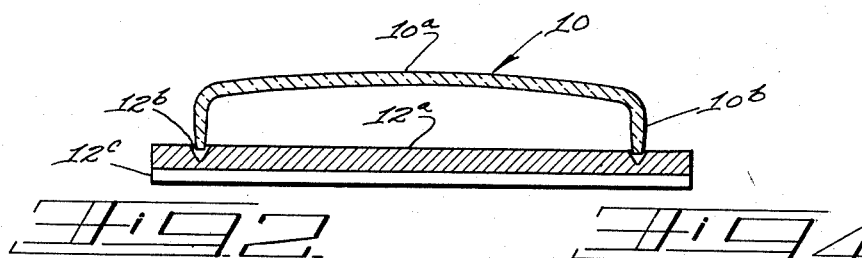
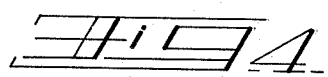
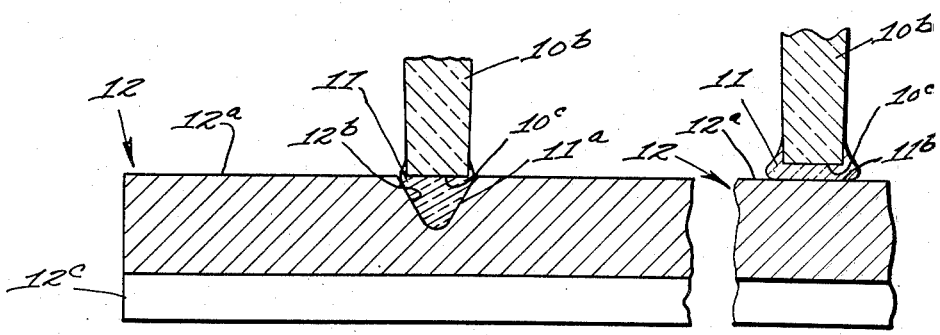
INVENTORS
K. M. HENRY
H. B. VINCENT
BY
W. A. Schaich &
Leonard D. Soubier
ATTORNEYS

2,819,561
APPLICATION OF VITREOUS SEALANT TO GLASS SEALING EDGES

Kenneth M. Henry and Harvard B. Vincent, Toledo, Ohio, assignors to Owens-Illinois Glass Company, a corporation of Ohio Application September 25, 1956, Serial No. 611,916

7 Claims. (Cl. 49—81)

The present invention relates to applying brazing glass compositions to preformed glass parts such as the face plate and funnel portions of a cathode-ray television picture tube envelope and more specifically to applying a low-melting glass sealant to their sealing areas for uniting the parts into a vacuum-tight tube envelope thereby.

Heretofore coating sealing areas of a preformed hollow glass part with a glass brazing or soldering composition has been accomplished by thermally fusing the sealant thereto at elevated temperatures and allowing the part to normally cool in air. This method has produced non-uniformity of the sealant and prohibitive stresses in the parent glass so that more extensive annealing of the entire part is required resulting in increased processing costs. Where a sealing surface has thusly been coated for sealing to a complemental surface of another glass part, extensive annealing may also cause warpage or distortion of the sealing surface, so that the part is either unsuitable for hermetic sealing or additional processing thereof is required. It is most desirable that the sealing composition be applied at minimum temperatures after all other processing steps of the part have been completed, so that the part may be sealed to another glass or metal part subsequently as desired to fulfill the exceedingly high standards of cathode-ray tube sealing. These requirements have not satisfactorily been met previously in fabricating an all-glass type envelope for color television picture tubes utilizing a glass-like sealant.

Accordingly, it is an object of this invention to provide an improved method of applying a vitreous sealing material to a prefabricated glass part wherein cooling stresses in the parent glass are reduced.

Another object of this invention is to provide a method of adhering a low-melting glass sealant to a preformed glass part wherein overheating of the part is avoided and the sealing material is suitably shaped for subsequent sealing at lower temperatures than required for its adherence.

Another object of this invention is to provide a simple method of shaping a low-melting glass sealing composition on sealing areas of a preformed hollow glass part and removing heat therefrom to eliminate distortion or stresses in the part on cooling.

A still further object of this invention is to provide a simple method of coating the sealing surfaces of a preformed glass television tube face plate with a low-melting glass sealing composition which may be utilized in joining several either similarly coated or uncoated parts more uniformly at lower temperatures.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a top plan view of a cathode-ray tube face plate and shaping member for practicing the subject invention.

Fig. 2 is a vertical sectional view taken along the line 2—2 of Fig. 1.

Fig. 3 is an enlarged sectional view of one portion of Fig._2.

Fig. 4 is a view similar to Fig. 3 illustrating a modification of the present invention.

While this invention will be described as specifically applied to the manufacturing of a cathode-ray tube part, it will be apparent to those skilled in the art that the principles of the invention are equally applicable to the manufacture of any type of preformed glass part having a sealing region to which it is desired to adhere a vitreous sealing material for subsequent uniting to another glass or metal part.

In a preferred embodiment of the present invention a glass cathode-ray tube face plate 10 is comprised of a curved viewing panel 10a bounded by the depending annular flange portion 10b which terminates in a planar annular sealing surface 10c. Face plate 10 may be either circular or rectangular in shape such as conventionally employed in all-glass cathode-ray tube envelopes utilized to form so-called black-and-white television picture tubes. However, the present invention more specifically pertains to the utilization of such a part in fabricating a tube envelope for color television use.

A low-melting glass sealing composition 11 is thermally adhered to face plate sealing surface 10c and contiguous areas thereto by any suitable method. Such sealing compositions have been fully disclosed in the copending patent application of Francl and Hagedorn, entitled "Low-Melting Glass Sealing Composition," filed December 22, 1955, Serial No. 554,753. One procedure is to dip the open edge of flange portion 10b into a bath of molten sealing composition 11 after face plate 10 has been properly preheated to a temperature of the order of about 250° F. and below about 500° F.

After face plate 10 has been coated with sealing composition 11, it is then immediately transferred to fully contact the heated upper surface 12a of a metallic shaping plate 12. Face plate 10 is gradually pressed against shaping plate 12 which, with sealing composition 11 still in a molten condition, produces a deformation of the sealing composition, causing it to assume the contour of the shaping member. Either the weight of the part alone or supplementary force approximating about 20 pounds may be employed depending upon the particular sealing composition and its thermal characteristics.

Shaping plate 12 has either a planar upper surface 12a or V-shaped groove 12b, the latter having the same general configuration as sealing surface 10c, for its utilization as the shaping medium. Sealing composition 11 may be formed into tapering annular projection 11a by groove 12b which on cooling provides a thin cross-section at its extremity (Fig. 3). The thin extremity of sealing composition 11 permits its being softened by heat at a temperature 30° to 40° F. lower than its normal melting point for uniting face plate 10 to another part at a slightly lower temperature.

Upper surface 12a of plate 12 is heated to a temperature of about 500° F. and within the range of from about 400° to 600° F., although below the melting point temperature of sealing composition 11, prior to contacting the sealing composition to prevent the formation of checks therein and sticking thereto.. Shaping plate 12 may be heated from below by a series of flames directed at a plurality of projections or baffles 12c on the lower surface of plate 12 to facilitate uniform heat distribution to upper surface 12a. Sealing composition 11 is cooled during its contact with metal plate 12 so that heat is conveyed into the metal rather than into glass flange 10b. The contact time may vary from approximately 1 to 15 seconds although an interval of 4 to 5 seconds is preferred. Removing heat from molten sealing composition 11 by contact with shaping plate 12 prevents the parent glass from becoming overheated to minimize thermal stresses in and distortion of the glass on cooling.

In the modification shown on Fig. 4 the coating of sealing composition 11 is flattened into a plane exposed surface 11b by full planar surface 12c of shaping plate 12.

The utility of the present method must be viewed in light of what occurs at the sealing edge during the process of adhering by fusion molten sealing composition 11 to sealing surface 10c. A rather steep temperature gradient is established between sealing surface 10c (hotter) and the mass of flange portion 10b (cooler). If after dipping, the part is simply allowed to cool normally in air, relatively high tension stresses will result. However, if a large amount of the residual heat contained in sealing composition 11 is removed by contact with cooler metal plate 12, the temperature gradient is substantially decreased and resulting stresses are correspondingly reduced. Any subsequent annealing of face plate 10 is easier to accomplish without deformation. Other methods of obtaining localized cooling of the edge are possible but metal shaping plate 12 has the advantages of accomplishing the several objectives of shaping and cooling simultaneously.

The method may include slight turning of face plate 10 after it is placed in contact with shaping plate 12. However, care must be exercised that an effect of twisting and/or deformation of the sealing composition does not occur. After the sealing composition has been shaped or flattened, the part may or may not be annealed as desired.

Various modifications may be resorted to within the spirit and scope of the appended claims.

We claim:

1. The method of preparing the sealing area of a preformed hollow glass part comprising the steps of thermally fusing a coating of low-melting glass sealing composition to said sealing area and shaping said coating in molten condition by contacting a heated plate maintained at a temperature below the melting point temperature of said sealing composition.

2. The method in accordance with claim 1, including the step of thermally fusing said coating of glass sealing composition to said sealing area by dipping.

3. The method of preparing the sealing area of a preformed hollow glass part comprising the steps of dipping the sealing area of said part into molten low-melting glass sealing composition to thermally fuse a coating thereto, and immediately contacting the coated sealing area and a heated plate maintained at a temperature below the melting temperature of said glass sealing composition with supplemental pressure to shape said molten sealing composition.

4. The method of preparing the annular open sealing edge portion of a prefabricated hollow glass face plate comprising the steps of thermally adhering an annular band of molten low-melting glass sealing composition to the sealing surface and adjacent areas of said sealing edge portion by dipping and immediately shaping the molten band of sealing composition by forcefully contacting said sealing composition and the heated surface of a metal plate of complemental configuration to said sealing edge portion.

5. The method of preparing the annular open sealing edge portion of a prefabricated hollow glass face plate comprising the steps of thermally adhering an annular band of molten low-melting glass sealing composition to the planar sealing surface and adjacent areas of said sealing edge portion and immediately shaping a molten band of sealing composition by forcefully contacting a heated surface of a metal plate with said molten band, said surface maintained at a temperature in the range of from 400° to 600° F., and having a complemental configuration to said sealing edge portion to shape and remove heat from said band of sealing composition.

6. The method in accordance with claim 5, including the step of flattening the molten annular band of sealing composition by contacting a heated planar surface of said metal plate.

7. The method in accordance with claim 5, including the step of shaping the molten band of sealing composition into an annular projection of tapering cross-section extending from said planar sealing surface by pressure contact with a V-shaped groove in said heated surface, said groove having the same configuration as said sealing surface.

References Cited in the file of this patent

UNITED STATES PATENTS

| | | |
|---|---|---|
| 2,127,150 | Zimmerman et al. | Aug. 16, 1938 |
| 2,205,582 | Steimel | June 25, 1940 |
| 2,215,644 | Hays, Jr. | Sept. 24, 1940 |
| 2,220,742 | Thorson | Nov. 5, 1940 |
| 2,301,940 | Fries | Nov. 17, 1942 |
| 2,304,714 | Stringer | Dec. 8, 1942 |
| 2,348,823 | Kirchheim | May 16, 1944 |
| 2,643,020 | Dalton | June 23, 1953 |
| 2,710,713 | Slater | June 14, 1955 |